US005764237A

United States Patent [19]
Kaneko

[11] Patent Number: 5,764,237
[45] Date of Patent: Jun. 9, 1998

[54] TEXTURE MAPPING APPARATUS COMPUTING TEXTURE ADDRESS BY FILL ADDRESS

[76] Inventor: Koichi Kaneko, c/o Yamaha Corporation 10-1 Nakazawa-cho, Hamamatsu-shi, Shizuoka-ken, Japan

[21] Appl. No.: 541,670

[22] Filed: Oct. 10, 1995

[30] Foreign Application Priority Data

Oct. 7, 1994 [JP] Japan ............... 6-270447
Oct. 7, 1994 [JP] Japan ............... 6-270448

[51] Int. Cl.$^6$ ............................. G06T 11/00
[52] U.S. Cl. ............................. 345/430
[58] Field of Search ............... 395/130, 129, 395/125, 133, 515–518

[56] References Cited

U.S. PATENT DOCUMENTS 5,553,208 9/1996 Murata et al. ............ 395/130 X

Primary Examiner—Almis R. Jankus
Attorney, Agent, or Firm—Pillsbury Madison & Sutro LLP

[57] ABSTRACT

A texture mapping apparatus applies a texture pattern to an image which two-dimensionally represents a three-dimensional object so as to display a surface structure of the object. A frame memory is provided with storage locations identified by addresses for storing image data representative of the image of the object pixel by pixel. A texture memory is provided with storage locations identified by addresses for storing texture data representative of the texture pattern. A CPU inputs fill coordinates to determine an area of the image to which the texture pattern is applied. Further, the CPU separately inputs texture coordinates to determine a corresponding area of the texture pattern which is applied to the area of the image. A fill address generator operates based on the fill coordinates for generating fill addresses of the frame memory which correspond to pixels in the area of the image. A texture address generator operates based on the texture coordinates for generating texture addresses of the texture memory which correspond to the fill addresses. A selector is operated to read out the texture data from the storage locations of the texture memory which are designated by the texture addresses, and to write the read texture data into storage locations of the frame memory which are designated by the corresponding fill addresses.

8 Claims, 9 Drawing Sheets

FIG.3A
FIG.3B
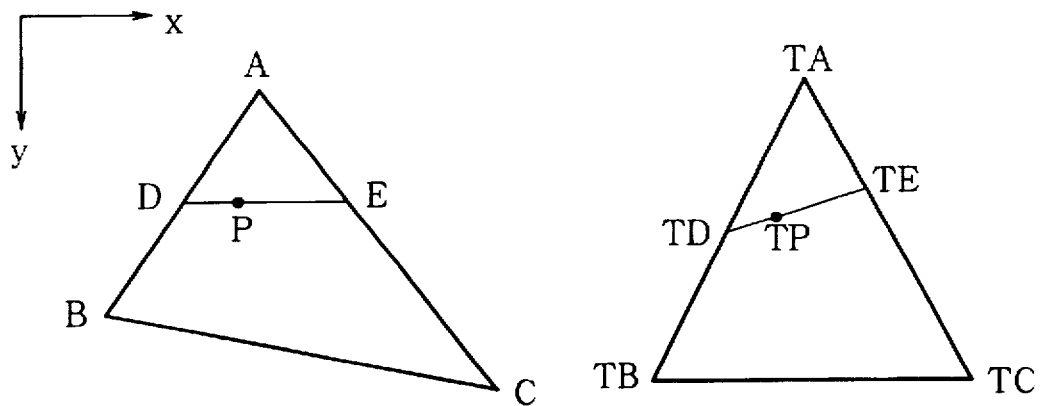
FIG.4
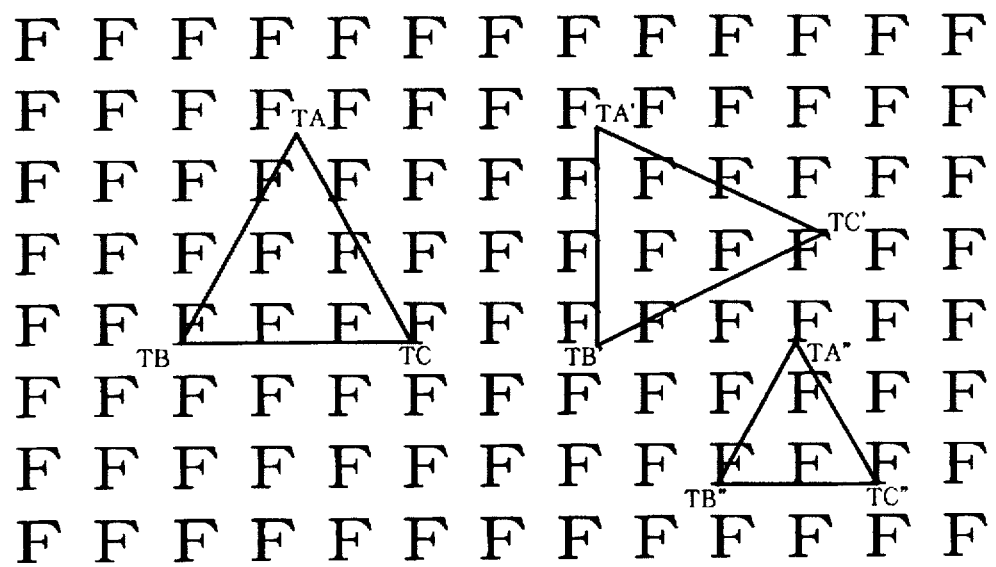

```
F.F  F  F.J.J  J  J.P.P  P  P.
 TA       TD TD     TE TE      TH
F F  F  F J J  J  J P P  P  P
F F  F  F J J  J  J P P  P  P
F.F  F  F.J.J  J  J.P.P  P  P.
 TB       TC TC     TF TF      TG
Q.Q  Q  Q.R.R  R  R.Z.Z  Z  Z.
 TH       TA TH     TE TB      TC
Q Q  Q  Q R R  R  R Z Z  Z  Z
Q Q  Q  Q R R  R  R Z Z  Z  Z
Q.Q  Q  Q.R.R  R  R.Z.Z  Z  Z.
 TG       TB TA     TD TG      TF
```

FIG.8
![FIG.8 texture map with regions F, T, Z, L and triangles TA, TB, TC, TA', TB', TC']
Coordinates: 0000H, tx, 1000H, 1FFFH (top); 0000H, ty, 1000H, 1FFFH (left); label 5 at bottom.
FIG.9A    FIG.9B
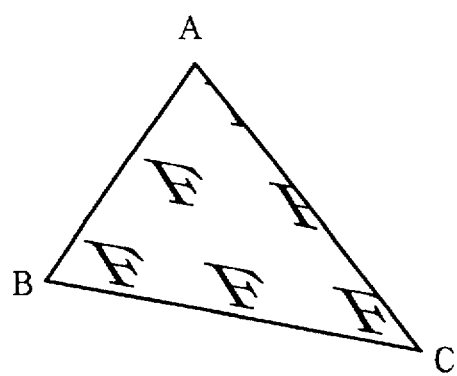
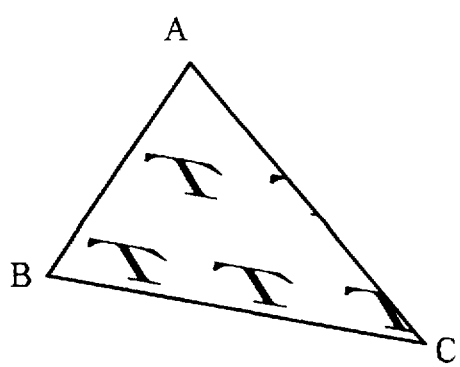

TEXTURE MAPPING APPARATUS COMPUTING TEXTURE ADDRESS BY FILL ADDRESS

BACKGROUND OF THE INVENTION

The present invention relates to a texture mapping apparatus for applying a desired texture to a surface of a three-dimensional object presented on a display in a three-dimensional graphic system or the like.

The Texture mapping is a known method for improving reality of an image in computer graphics where a three-dimensional object is displayed in the form of a two-dimensional or planar image. As shown in FIG. 12B, in texture mapping, a texture pattern 32 is applied to a surface of a three-dimensional object 31 exemplified by a cubic body to realisticly present surface roughness or surface structure of the displayed object 31. In the practical computer graphic system, a texture memory is installed to memorize texture data representative of a texture pattern to be mapped. On the other hand, the three-dimensional object 31 is displayed as a two-dimensional image such that the cubic body is presented by a group of three tetragons. Generally, a three-dimensional object is two-dimensionally displayed as a group of numerous polygons. The texture mapping utilizes fill coordinates (x,y) defined on a two-dimensional display plane so as to specify vertexes of each polygon to which a texture pattern is applied. Further, the texture memory is set with a texture pattern area congruent or identical to the polygon specified by the fill coordinates of the vertexes. The texture data contained in the area is read out from the texture memory, and is allocated to the specified polygon. Stated otherwise, the texture pattern is cut out in the same shape as the designated polygon, and is fitted into the corresponding polygon as it is.

However, in the above noted conventional texture mapping method, the texture memory must be set with a texture pattern area exactly matching with the shape of each polygon one by one. For example, the texture mapping is applied to the cubic body of FIG. 12A such that adequate texture patterns are allocated to respective ones of front face FR, top face TP and right side face SD, which appear on a two-dimensional image of the cubic body. These faces FR, TP and SD actually have the same square shape in the three-dimensional object. However, the cubic object is two-dimensionally presented by the method of projections so that these faces FR, TP and SD are viewed in different tetragonal shapes. Adequate texture patterns must be stored to match with these tetragonal shapes. For example, as shown in FIG. 12B, the front face FR, top face TP and right side face SD are given respective texture patterns which are apparently different from each other. Therefore, different texture patterns must be prepared. Stated otherwise, for example, when the front face FR is observed as shown in FIG. 12B, if the cubic object is rotated around a horizontal x-axis by 90° in the direction indicated by the arrow, the initial front face FR displaces to a position of the top face TP. The texture pattern of the top face apparently changes as a consequence of this rotational displacement. Accordingly, two kinds of texture patterns must be prepared separately from each other. In a similar manner, if the cubic object is rotated around a vertical y-axis by 90° in the direction indicated by the arrow, the initial front face FR displaces to the position of the right side face SD. The texture pattern varies also in this case. As shown, although every face has a common texture pattern in an actual three-dimensional object, the conventional texture mapping method must prepare a plurality of texture patterns in taking account of graphic variation of the object by rotation, displacement, expansion, contraction and so on. Therefore, there is a drawback in that the texture memory requires a huge capacity. However, the memory capacity has a practical limitation so that freedom of the texture pattern mapping is unduly restricted. If the memory capacity is not expanded, only one kind of texture pattern may be uniformly allocated to all of the faces, resulting in an unnatural texture mapping as shown in FIG. 12C.

As mentioned before, the texture memory has a given memory plane which stores the texture data representative of the texture pattern. A texture pattern area to be cut out is set on the memory plane in matching with a corresponding polygonal shape of the two-dimensional image of the object. Physically, the texture memory has a limited memory plane. Therefore, if the set area of the texture pattern to be mapped overflows the memory plane of the provisionally stored texture data, the texture pattern mapping is made impossible for the overflowing portion. To avoid this, the texture data must be reserved by leaving a considerably wide margin, thereby disadvantageously increasing the texture memory capacity.

SUMMARY OF THE INVENTION

In view of the above noted drawbacks of the prior art, a first object of the invention is to provide a texture mapping apparatus which can allocate texture data in a diverse and flexible manner while saving the texture memory capacity. Further, a second object of the invention is to provide a texture mapping apparatus which can be efficiently and economically store the texture data and which can effectively store multiple kinds of texture data in a limited memory plane.

In a first aspect of the invention, the texture mapping apparatus comprises frame memory means, texture memory means, coordinates input means, address generating means and mapping means, in order to allocate a texture pattern to a two-dimensional image which represents a three-dimensional object to thereby present a surface configuration of the object. The frame memory means is provided with a storage location for storing an image data representative of the image pixel by pixel, and an address specifying the storage location. The texture memory means is provided with a storage location for storing a texture data representative of the texture pattern, and an address for specifying the storage location. The coordinates input means inputs fill coordinates which determines an area of the image to which the texture pattern is allocated, and inputs texture coordinates separately from the fill coordinates, the texture coordinates determining an area of the texture pattern which is allocated to the corresponding area of the image. The address generating means operates according to the fill coordinates for generating fill addresses of the frame memory means which correspond to pixels contained within the area of the image, and operates according to the texture coordinates for generating texture addresses of the texture memory means which correspond to the fill addresses. The mapping means reads out the texture data from the storage locations of the texture memory means, which are specified by the generated texture addresses, and writes the read texture data into the storage locations of the frame memory means, which are designated by the generated fill addresses.

In a second aspect of the invention, the texture mapping apparatus comprises frame memory means, texture memory means, coordinates input means, address generating means and mapping means, in order to map a texture pattern on a two-dimensional image of a three-dimensional object to present a surface structure of the object. The frame memory means has storage locations for storing image data representative of the two-dimensional image pixel by pixel, each storage location being identified by an address. The texture memory means stores texture data representative of a periodic texture pattern in a memory region defined in a part of a memory plane of the texture memory means. Further, the texture memory means has a complete address which is composed of a train of higher order bits and lower order bits and which is set over a whole of the memory plane. Moreover, the texture memory means has a sub-address composed of the lower order bits and being assigned to a storage location of each texture data memorized in the partial memory region. The coordinates input means inputs fill coordinates which specify an area of the image to which the texture pattern is allocated, and inputs texture coordinates separately from the fill coordinates, the texture coordinates specifying an area of the texture pattern which is allocated to the corresponding area of the image. The address generating means operates according to the inputted fill coordinates for generating fill addresses of the frame memory means which corresponds to pixels contained in the area of the image. Further, the address generating means operates according to the inputted texture coordinates for generating the texture complete addresses of the texture memory means which correspond to the fill addresses. Moreover, the address generating means masks the higher order bits of the texture complete addresses to convert the same into texture sub-addresses. The mapping means operates according to the converted texture sub-addresses to read out the texture data from the storage locations within the memory region, and writes the read texture data into the storage locations of the frame memory means, which are designated by the corresponding fill addresses.

In a specific form of the first aspect of the invention, the coordinates input means inputs the fill coordinates to determine the area of the image in the form of a polygon having at least three vertexes. Further, the coordinates input means inputs the texture coordinates to determine the corresponding area of the texture pattern in the form of another polygon having the same number of vertexes but a different shape than the first-mentioned polygon. Stated otherwise, the texture coordinates can be freely inputted separately from the fill coordinates in order to allocate a desired cut of the texture pattern in response to graphic operations such as rotation, displacement, expansion and contraction of the three-dimensional object. The texture coordinates can be flexibly and freely inputted relative to fixed fill coordinates in response to the graphic operation so that the texture pattern is flexibly expanded, contracted and rotated to fit into the corresponding polygon of the two-dimensional image. Therefore, flexible mapping can be achieved. The texture memory means only stores a standard texture pattern to thereby save the memory capacity. In another specific form of the first aspect of the invention, the coordinates input means inputs fill coordinates which are updated according to the variation of the image area in response to the graphic operation of the object. Meanwhile, the coordinates input means inputs fixed texture coordinates regardless of the graphic operation of the object. Generally, in motion display of the moving three-dimensional object, polygons contained in the displayed image are continuously varied in their shapes according to expansion, contraction, rotation and displacement of the object. In such a case, the inventive texture mapping apparatus can be effectively utilized to simply input initial texture coordinates for the respective polygons. Thereafter, the fill coordinates are automatically updated by a computer or the like in response to the variation of each image area in the motion display. On the other hand, the initially inputted texture coordinates are used as they are to carry out the texture mapping process in conformity with the moving pictures. Therefore, the inventive apparatus can realize natural texture mapping while reducing the work load of the CPU.

According to the second aspect of the invention, the texture mapping apparatus treats a texture composed of a periodic base pattern. A minimum unit of the periodic base pattern is registered in the limited or segmented memory region of the texture memory. If a cut area of the texture pattern is designated beyond the limited memory region, the address generating means converts the initially generated texture complete address into the texture sub-address which is confined within the memory region. By this, correct mapping can be carried out without loss of texture data. Therefore, the capacity of the texture memory means can be significantly saved. Further, in a specific form, the texture memory means stores the texture data representative of different texture patterns in a plurality of memory regions which are obtained by dividing the entire memory plane. In this case, the address generating means feeds the converted texture sub-address to the mapping means together with a region number specifying one memory region in place of the masked higher order bits of the complete or full address. Namely, the plurality of memory regions are reversed in the texture memory means. The different texture patterns are stored in the respective memory regions. The address generating means adds the regions number (offset value) indicative of a desired memory region of the texture pattern to the higher order bits of the texture complete address, thereby converting a given texture complete address into a texture sub-address limited to a desired memory region. Accordingly, a multiple of texture patterns can be efficiently reserved in the limited capacity of the texture memory means. Further, a size of the memory region can be freely set to store the basic texture pattern.

BRIEF DESCRIPTION OF THE DRAWINGS

FIGS. 3A and 3B are schematic diagrams showing examples of fill coordinates and texture coordinates inputted into the inventive texture mapping apparatus.

FIG. 4 is a schematic diagram showing the relation between the texture coordinates and a memory plane of a texture memory installed in the inventive texture mapping apparatus.

FIG. 8 is an illustrative diagram showing the division of a memory plane of the texture memory.

FIGS. 9A and 9B are schematic diagrams showing examples of texture mapping based on regional division.

DETAILED DESCRIPTION OF PREFERRED EMBODIMENTS

Figure 1:
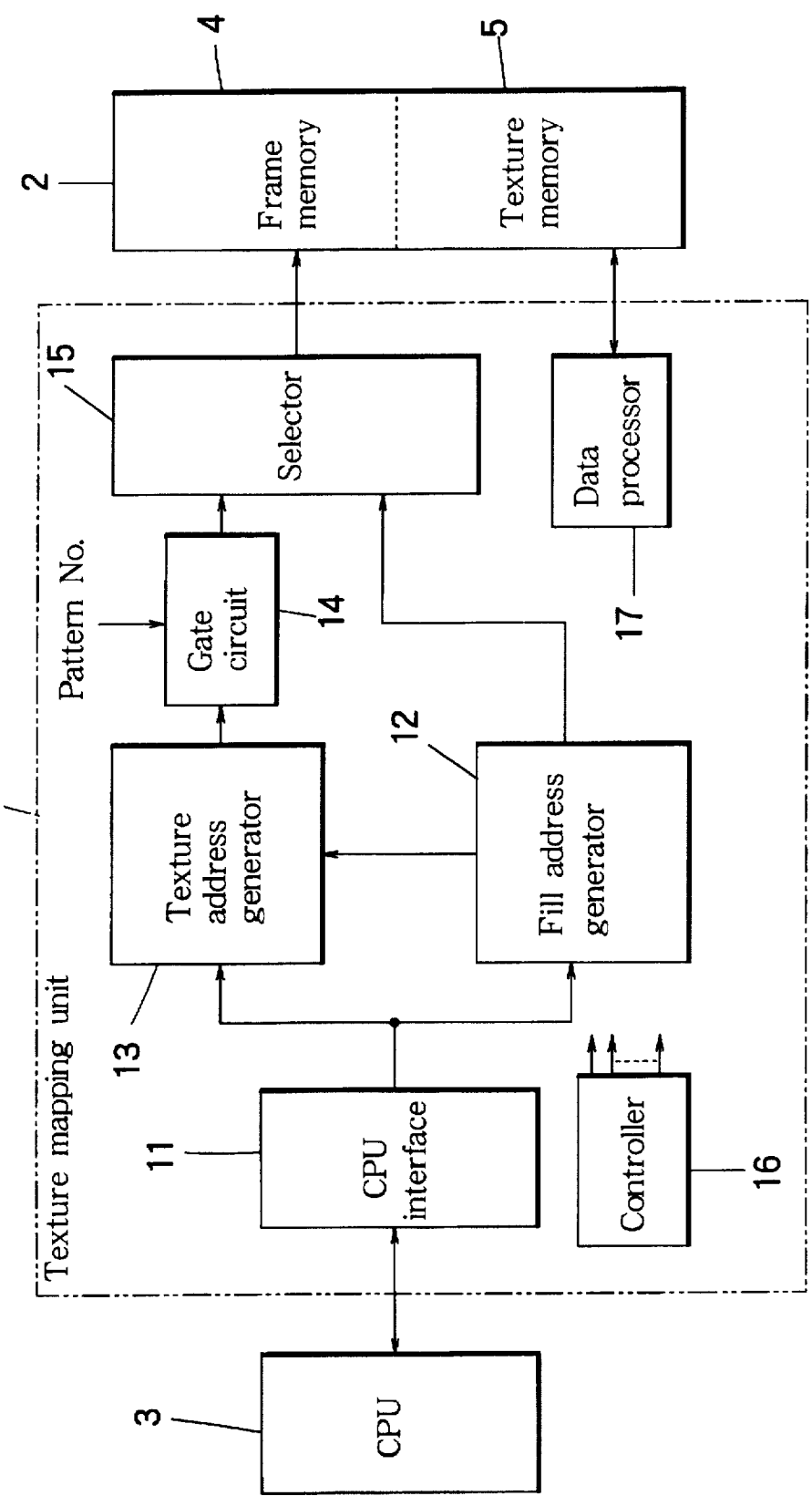
FIG. 1 is a block diagram showing an overall construction of the inventive texture mapping apparatus.

Hereinafter, a detailed description is given for preferred embodiments of an inventive texture mapping apparatus in conjunction with the drawings. The inventive texture mapping apparatus is comprised of a texture mapping unit 1 and a picture memory unit 2. The texture mapping unit 1 is composed of a one ship IC or the like, and is connected to an external control CPU 3. The picture memory unit 2 includes a frame memory 4 and a texture memory 5. The frame memory 4 stores a two-dimensional image of a three-dimensional object on which a texture is mapped. In detail, the frame memory 4 is provided with storage locations for storing image data representative of the object image pixel by pixel. Each storage location corresponds to one pixel and is identified by an address. Stated otherwise, the frame memory 4 defines a virtual display plane which is assigned with a fill coordinate system. Therefore, the fill coordinate system is used to represent the address of the storage location of the image data. On the other hand, the texture memory 5 is provided with storage locations for storing texture data representative of a texture pattern to be mapped. Each storage location is identified by an address. The texture memory 5 defines a memory plane assigned with a texture coordinate system. The texture coordinate system is used to represent the address of the storage location of the texture data.

The external CPU 3 constitutes coordinates input means for inputting fill coordinates which determine an image area to which the texture pattern is allocated, and for separately inputting texture coordinates which determine a texture pattern area. In detail, the CPU 3 uses the fill coordinate system to input fill coordinates specifying three vertexes of a triangle which define the image area to which the texture pattern is applied. Further, the CPU 3 uses the texture coordinate system to input the texture coordinates specifying three vertexes of another triangle which define the texture pattern area allocated to the corresponding image area. Generally, the fill coordinates are inputted to determine the image area in the form of a polygon having at least three vertexes, while the texture coordinates are inputted to determine the texture pattern area in the form of another polygon having the same number of vertexes but a different shape than the corresponding image area. Namely, the corresponding pair of polygons may not have the same shape. It is sufficient that the correspondence is established between vertexes of the pair of polygons. The CPU 3 freely sets the fill coordinates and the texture coordinates according to commands of a user. For example, after the user designates initial fill coordinates, the CPU 3 automatically updates the fill coordinates according to graphic operation by the user such as rotation, displacement, expansion and contraction of the three-dimensional object. Importantly, the CPU 3 gives the initial values of the fill coordinates and the texture coordinates to the texture mapping unit 1. Thereafter, the fill coordinates are successively updated in response to the graphic operation of the object such as rotation, displacement, expansion and contraction. Meanwhile, the initial values of the texture coordinates are used as they are without regard to the graphic operation, thereby significantly saving work amounts of the user and the CPU 3. As described above, the coordinates input means composed of the CPU 3 successively calculates and updates the fill coordinates in response to variation of the image area which varies by the graphic operation of the object, while the fixed texture coordinates are maintained as they are in spite of the graphic operation of the object.

This coordinate data is fed through a CPU interface 11 to a fill address generator 12 and a texture address generator 13. The fill address generator 12 operates according to the inputted values of the fill coordinates indicative of the vertexes of the polygon for generating the fill addresses of the frame memory 4 which correspond to pixels filled within the polygon. The texture address generator 13 operates according to the inputted values of the texture coordinates for generating texture addresses of the texture memory 5, which correspond to the fill addresses of the frame memory 4. The address is given as x and y coordinates values. Generally, a memory is constructed such that memory cells or storage locations are arranged over a two-dimensional memory plane, and are specified by addresses of rows and columns. Therefore, the memory address and the x and y coordinates correspond to each other one to one. Thus, the memory address is technically identical to the value of the x and y coordinates. The fill address generator 12 operates based on the inputted values of the fill coordinates for successively generating the fill addresses of the frame memory 4 in a horizontal direction (x-axis) and a vertical direction (y-axis) to cover all of the pixels filled in the polygon such as a triangle defined by the inputted fill coordinates. The texture address generator 13 generates the texture addresses of the texture memory 5, which correspond to the fill addresses calculated by the fill address generator. The texture addresses computed by the texture address generator 13 are fed to a gate circuit 14. The gate circuit 14 converts the fed texture complete address or full address composed of a long bit train into a texture sub-address of a short bit train. The texture sub-address is localized to a memory region which is set in a part of the texture memory 5. The memory region scores texture data representative of a texture pattern designated by a pattern number or region number. The texture address outputted from the gate circuit 14 is fed to one input terminal of a selector 15. Another input terminal of the selector 15 receives the fill addresses outputted by the fill address generator 12. The selector 15 is controlled by an internal controller 16 to switchably feed either the fill or texture addresses to the picture memory unit 2. These addresses control reading and writing of data in the picture memory unit 2. Namely, the selector 15 constitutes mapping means for reading out the texture data from the storage locations of the texture memory 5 designated by the texture addresses, and for writing the read texture data into the corresponding storage locations of the frame memory 4, which are designated by the fill addresses. A data processor 17 processes the data retrieved from the picture memory unit 2. The controller 16 controls all of the units and circuits inside the apparatus.

Figure 2:
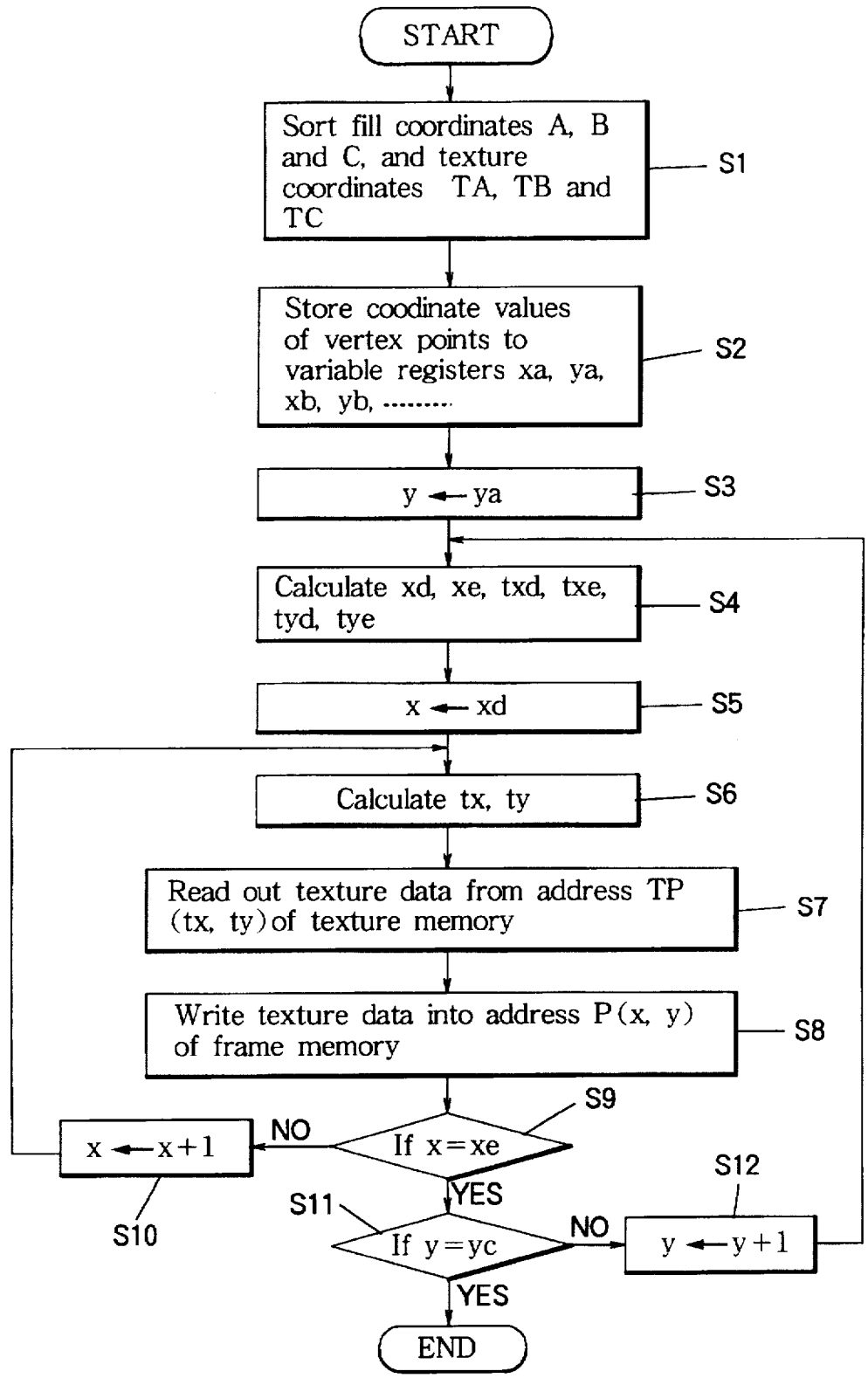
FIG. 2 is a flow chart showing the operation of the inventive texture mapping apparatus.

Next, referring to the flow chart of FIG. 2, detail description is given for the operation of the inventive texture mapping apparatus shown in FIG. 1. The fill address generator 12 provided in the texture mapping unit 1 receives the fill coordinates A, B and C (vertexes) and the texture coordinates TA, TB and TC (vertexes) from the CPU 3. Then, the first step S1 is undertaken to sort the fill coordinates A, B and C in the order of smaller y coordinate values. Correspondingly, the texture coordinates TA, TB and TC are also sorted or rearranged. Then, the sorted fill coordinates are re-labeled by A, B and C in the order of the smaller y coordinate values. Correspondingly, the texture coordinates are also re-labeled by TA, TB and TC. FIGS. 3A and 3B show the correspondence between the fill coordinates and the texture coordinates after the sorting by the step S1.

Next, in step S2, the coordinate values of the vertexes A, B, C, TA, TB and TC are stored in registers indicative of variables xa, ya, xb, yb, . . . , as shown by the following formula (1).

$$
\begin{aligned}
xa &= x\text{ coordinate of vertex } A & ya &= y\text{ coordinate of vertex } A \\
xb &= x\text{ coordinate of vertex } B & yb &= y\text{ coordinate of vertex } B \\
xc &= x\text{ coordinate of vertex } C & yc &= y\text{ coordinate of vertex } C \\
txa &= x\text{ coordinate of vertex } TA & tya &= y\text{ coordinate of vertex } TA \\
txb &= x\text{ coordinate of vertex } TB & tyb &= y\text{ coordinate of vertex } TB \\
txc &= x\text{ coordinate of vertex } TC & tyc &= y\text{ coordinate of vertex } TC
\end{aligned} \quad (1)
$$

Subsequently, step S3 is undertaken to give ya as an initial value of y, which indicates the y coordinates of a pixel P contained within the triangle ABC which defines an image area to which a texture pattern is allocated. Further, step S4 is undertaken according to the following formula (2) to calculate x coordinate xd of point D, x coordinate xe of point E, x and y coordinates txd and tyd of point TD, and x and y coordinates txe and tye of point TE. As shown in FIGS. 3A and 3B, the point D exists on the side AB, and the point E exists on the other side AC. A horizontal segment connects the pair of points D and E. On the other hand, the point TD exists on the side TATB, and the point TE exists on the other side TATC. A point TP exists on a segment connecting the points TD and TE, and corresponds to the point P. As mentioned before, the point P indicates a fill address of a pixel contained within the image area determined by the triangle ABC.

$$
\begin{aligned}
xd &= xa + (xb - xa) * (y - ya)/(yb - ya) \\
xe &= xa + (xc - xa) * (y - ya)/(yb - ya) \\
txd &= txa + (txb - txa) * (y - ya)/(yb - ya) \\
txe &= txa + (txc - txa) * (y - ya)/(yb - ya) \\
tyd &= tya + (tyb - tya) * (y - ya)/(yb - ya) \\
tye &= tya + (tyc - tya) * (y - ya)/(yb - ya)
\end{aligned} \quad (2)
$$

Next, step S5 is undertaken to give xd as an initial value of x. Further, the values of x, y, xd, xe, txd, txe, tyd and tye are transferred to the texture address generator 13. Subsequently in step S6, the texture address generator 13 calculates the x and y coordinates tx and ty of the point TP according to the following formula (3).

$$
\begin{aligned}
tx &= txd + (txe - txd) * (x - xd)/(xe - xd) \\
ty &= tyd + (tye - tyd) * (x - xd)/(xe - xd)
\end{aligned} \quad (3)
$$

Then, in step S7, the selector 15 is operated to select the output of the texture address generator 13 so as to read out the texture data from the storage location of the texture memory 5 designated by the address (tx, ty) of the point TP. Further, step S8 is undertaken to write the retrieved texture data into the corresponding storage location of the frame memory 4, which is designated by the address (x, y) of the point P. At this moment, the data processor 17 may apply shading treatment to the texture data, before writing the texture data into the frame memory 4.

The above described texture mapping process is repeatedly executed while x is incremented until the same reaches xe through steps S9 and S10. When x reaches xe, y is incremented by one in step S12, thereby computing a next pair of points D and E defining a next horizontal segment. Then, the same operation is conducted to calculate the x and y coordinates values of points P and TP, i.e., the fill address and the texture address. This operation is repeatedly carried out until y reaches c. If step S11 judges that y=yc is satisfied the texture mapping process is ended. In the operation, when y reach yb, the formula (2) is replaced by the following formula (4) for calculating the values of xd, txd and tyd at the step S4.

$$
\begin{aligned}
xd &= xb + (xc - xb) * (y - yb)/(yc - yb) \\
txd &= txb + (txc - txb) * (y - yb)/(yc - yb) \\
tyd &= tyb + (tyc - tyb) * (y - yb)/(yc - yb)
\end{aligned} \quad (4)
$$

By the above described operation, the texture data stored in the texture memory 5 are allocated to the image area specified by the fill coordinates. Namely, in the present embodiment, the address generators 12 and 13 operated based on the fill coordinates representative of vertexes of a polygon for carrying out interpolative computation in the horizontal and vertical directions to calculate fill addresses of pixels contained or filled within the polygon. Further, the address generators 12 and 13 operate based on the inputted texture coordinates and the generated fill addresses for calculating the corresponding texture addresses.

Figure 5A:
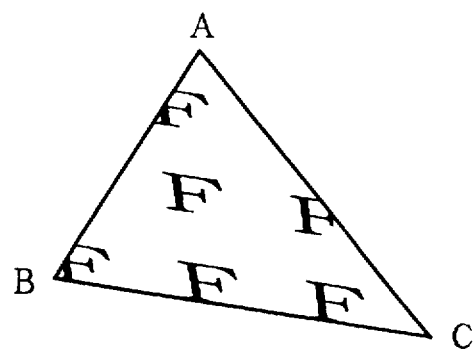
FIGS. 5A, 5B and 5C are schematic diagrams showing examples of mapped texture patterns.
Figure 5B:
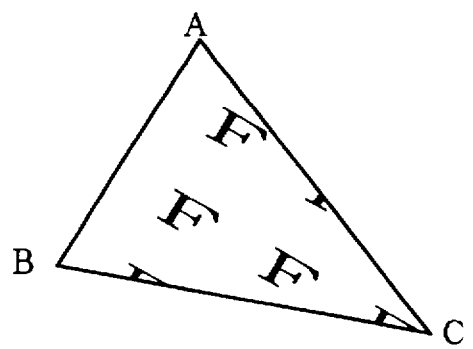
Figure 5C:
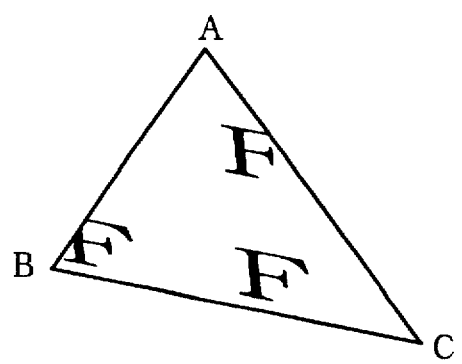

Referring to FIG. 4, a description is given for an example of the texture mapping. FIG. 4 shows a memory plane of the texture memory 5, which stores texture data representative of a given texture pattern schematically exemplified by a periodical pattern of the alphabet letter "F" in this embodiment. Further, as exemplified by FIG. 3A, the fill coordinates are inputted to specify vertexes A, B and C of a relatively flat triangle. As exemplified by FIG. 4, the texture coordinates are inputted to specify vertexes TA, TB and TC of another triangle. The triangle ABC defining the image area has a different shape from the triangle TATBTC defining the corresponding texture pattern area. In such a case, as shown in FIG. 5A, the texture pattern is modified into a flat form which is fitted into the triangle ABC defined by the fill coordinates. In another case where texture coordinates are inputted to define vertexes of a triangle TA'TB'TC' which is a moderately rotated form of the previous triangle TATBTC, the texture pattern is modified into a moderately rotated pattern, as shown in FIG. 5B, which is allocated to the triangle ABC. In a further case where texture coordinates are inputted to define vertexes of a triangle TA"TB"TC" which is a reduced form of the previous triangle TATBTC, the triangle ABC is mapped with an expanded texture pattern as shown in FIG. 5C. In such a manner, according to the invention, the texture coordinates are freely changed relative to the fill coordinates so that the texture pattern can be freely mapped in deformed, rotated, expanded and reduced forms.

Figures 6A, 6B:
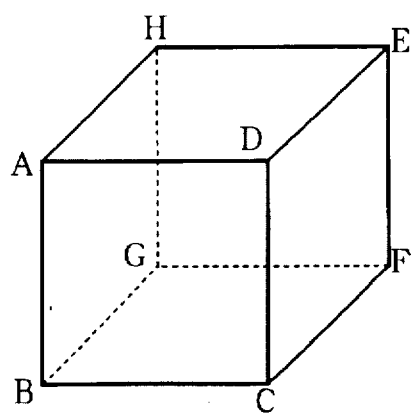
FIGS. 6A and 6B show a cubic body exemplifying a three-dimensional object, and a texture pattern mapped to the cubic body.

Description is given now for another example of the inventive texture mapping with reference to FIGS. 6A and 6B. As shown in FIG. 6B, the texture mapping is applied to an object of a cubic shape. This cubic body is enclosed by six squares defining respective faces of the cubic. FIG. 6A shows texture patterns allocated to the respective square faces. A first texture pattern cut out along a square TAT-BTCTD is allocated to a front square face ABCD. A second texture pattern enclosed by a square TDTCTFTE is allocated to a right side square face DCFE. A third texture pattern bordered by a square TETFTGTH is allocated to a back square face EPGH. A fourth texture pattern enclosed by a square THTGTBTA is allocated to a left side HGBA. A fifth texture pattern enclosed by a square THTATDTE is applied to a top face HADE. A sixth texture pattern enclosed by a square TBTGTCTF is applied to a bottom face BGCF.

Figure 7A:
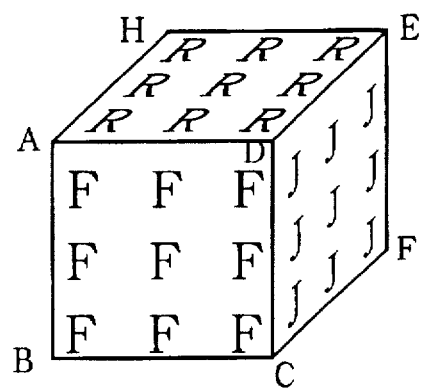
FIGS. 7A, 7B and 7C show variation of the texture pattern observed when the cubic body is rotationally displaced.
Figure 7B:
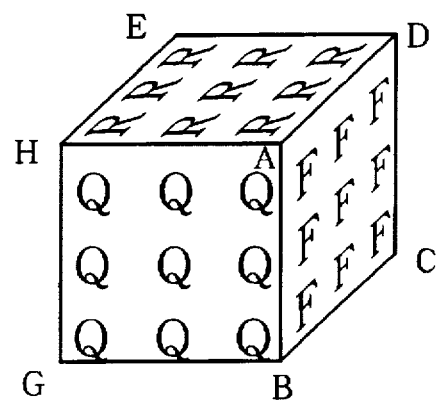
Figure 7C:
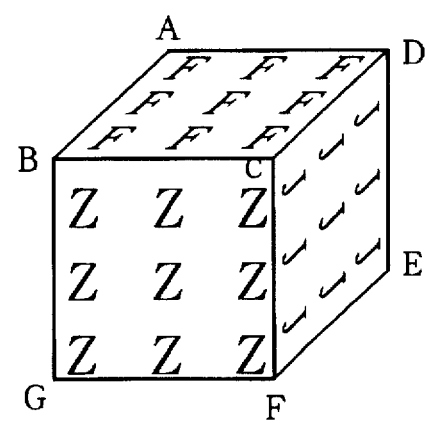

FIG. 7A shows the appearance of the cubic object mapped by the texture patterns according to the above defined allocation. FIG. 7B shows another appearance of the object where the cubic body is rotated counterclockwise around the vertical axis by 90°. Namely, the square face ABCD is displaced from the front to the right side. In a similar manner FIG. 7C shows a further appearance of the object where the cubic body is rotated around the horizontal axis by 90°. The square face ABCD is displaced from the front to the top. In such a manner, when the three-dimensional object is rotated by graphic operation, the CPU 3 calculates fill coordinates of the vertexes of the cubic body, and inputs the calculated fill coordinates into the texture mapping unit. ON the other hand, the texture coordinates shown in FIG. 6A are fixed as they are initially inputted while the cubic body is variably rotated. For example, if the square face ABCD is displaced from the front to the right side, the texture pattern composed of the letter "F" is deformed accordingly to fit into the right side face ABCD. In a similar manner, when the square face ABCD is displaced from the front to the top, the texture pattern is accordingly modified by the inventive texture mapping. Such an operation can reduce the work load of the CPU 3.

In the case where the texture is composed of a periodic pattern or repeat pattern as shown in FIG. 4, it would not be efficient to store the texture data in the texture memory 5 throughout the entire memory plane corresponding to the entire display plane defined by the fill coordinates system. In view of this, a region division method is adopted according to the invention to achieve efficient use of the texture memory plane. Namely, the texture memory 5 stores the texture data representative of a periodic texture pattern in a memory region provided in a part of the entire memory plane. In such a case, complete addresses composed of a bit train having higher order bits and lower order bits are set throughout the entire memory plane, while sub-addresses composed of the lower order bits are assigned to the memory region. Further, the texture address generator 13 operates according to the inputted texture coordinates for calculating the texture complete addresses, and then masking the higher order bits of the complete addresses to convert the same into the texture sub-addresses. The texture data are read out from storage locations of the memory region according to the converted sub-address. Actually, the texture memory 5 stores the texture data representative of different texture patterns in a plurality of memory regions which are provided by dividing the entire memory plane. Further, the texture address generator 13 and the gate circuit 14 feed the converted texture sub-addresses to the selector 15 together with a region number or pattern number which specifies one of the memory regions in place of the masked higher order bits.

Hereinafter, this region division method is described in detail with reference to FIG. 8. As shown in the figure, the texture data are partly stored and different kinds of texture data are registered in a region division manner, thereby achieving efficient use of the texture memory 5. In the illustrated example, the relation between the texture addresses and the texture data are shown in the following Table 1. In the table, the texture address is represented by four digits in hexadecimal notation. Stated otherwise, the texture address has a 16 bit construction.

TABLE 1

| Texture address (Hexadecimal notation) | | Texture data |
|---|---|---|
| tx | ty | |
| 0000–0FFF | 0000–0FFF | Periodic pattern of "F" |
| 1000–1FFF | 0000–0FFF | Periodic pattern of "T" |
| 0000–0FFF | 1000–1FFF | Periodic pattern of "Z" |
| 1000–1FFF | 1000–1FFF | Periodic pattern of "L" |

In this example, the texture address generator 13 generates the texture complete address (tx, ty) having a long bit train structure of 16 bits. The gate circuit 14 replaces 4 bits of the higher order (the highest digit) by a fixed value (region number) which specifies a memory region storing a desired texture pattern. For example, the four bits of the higher order of the texture address (tx, ty) are replaced by digit 0 of hexadecimal notation, respectively, to designate the periodic texture pattern of letter "F". Namely, as shown in FIG. 8, the texture coordinates are inputted as a set of addresses TA(1 - - -, 0 - - - ), TB(0 - - -, 1 - - - ) and TC(1 - - -, 1 - - - ) which are out of the memory region storing the periodic pattern of "F". The, the highest digit (the four bits of the higher order) is replaced by 0 in the respective addresses. Consequently, the vertex coordinates of the initial triangle TATBTC are converted into TA'(0 - - -, 0 - - - ), TB'(0 - - -, 0 - - - ) and TC'(0 - - -, 0 - - - ) so that the initial triangle can be shifted into the memory region storing the desired texture pattern "F".

Consequently as shown in FIG. 9A, the periodical pattern of the letter "F" is exactly cut out and is fitted into the triangle ABC. In another example, the four bits of the higher order of the addresses indicating the vertexes of the triangle TATBTC are replaced by "1" for tx and "0" for ty so that another feature composed of periodic pattern of letter "T" is cut along the triangle TATBTC, and is fitted into the corresponding image area defined by the triangle ABC as shown in FIG. 9B. In such a manner, the texture address generator 13 calculates the texture complete addresses based on the texture coordinates. Thereafter, the gate circuit 14 masks the higher order bits to convert the same into the texture sub-addresses.

Figure 10:
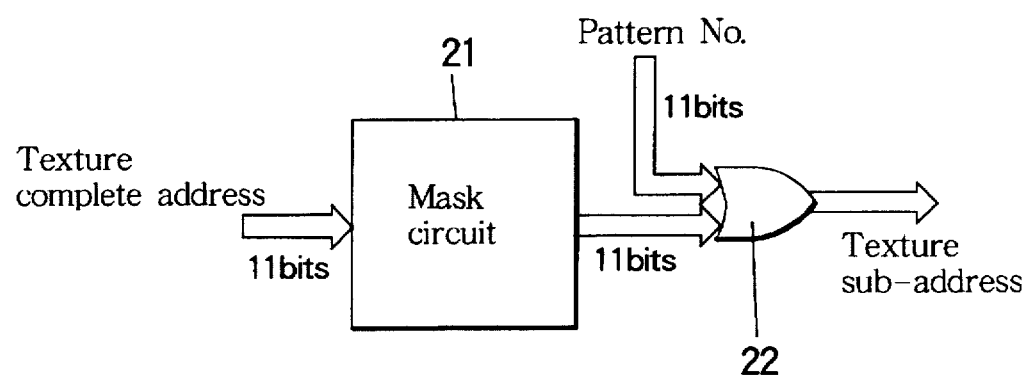
FIG. 10 is a circuit diagram showing the conversion of the texture address.

FIG. 10 shows a detailed construction of the gate circuit 14. The gate circuit 14 is comprised of a mask circuit 21 and an OR circuit 22. The mask circuit 21 masks the texture complete address outputted from the texture address generator 13 such that the higher order bits of the complete address is replaced by "0". In case that the texture complete address is composed of 11 bits, the following Table 2 shows the relation between a size of one divisional memory region storing one kind of the texture data and a bit number to be masked by the mask circuit 21.

TABLE 2

| size | 10 | 9 | 8 | 7 | 6 | 5 | 4 | 3 | 2 | 1 | 0 |
|---|---|---|---|---|---|---|---|---|---|---|---|
| 8 | 0 | 0 | 0 | 0 | 0 | 0 | 0 | 0 | b2 | b1 | b0 |
| 16 | 0 | 0 | 0 | 0 | 0 | 0 | 0 | b3 | b2 | b1 | b0 |
| 32 | 0 | 0 | 0 | 0 | 0 | 0 | b4 | b3 | b2 | b1 | b0 |
| 64 | 0 | 0 | 0 | 0 | 0 | b5 | b4 | b3 | b2 | b1 | b0 |
| 128 | 0 | 0 | 0 | 0 | b6 | b5 | b4 | b3 | b2 | b1 | b0 |
| 256 | 0 | 0 | 0 | b7 | b6 | b5 | b4 | b3 | b2 | b1 | b0 |
| 512 | 0 | 0 | b8 | b7 | b6 | b5 | b4 | b3 | b2 | b1 | b0 |
| 1024 | 0 | b9 | b8 | b7 | b6 | b5 | b4 | b3 | b2 | b1 | b0 |

In Table 2, the top row indicates output bit order of the mask circuit 21. Bit numbers 0–10 are written in the top row from lower to higher order. Each of the second to the last rows indicates bit values corresponding to the respective bit orders. The bit value 0 indicates a bit order to be masked, while the bit value bk indicates that a bit of k-th order of a texture complete address is passed as it is by the mask circuit 21. The texture address outputted by the mask circuit 21 is processed by the OR gate circuit 22 such that a part of the address having the bit value 0 is replaced by a given region number designating a desired texture pattern. With reference to the second row of Table 2, an example is given where the texture address of 11 bits structure is divided into 8 bits of the higher order and 3 bits of the lower order. The 3 bits of the lower order can define a memory region having a size of 8×8. The 8 bits of the higher order can designate $2^8=256$ kinds of memory regions.

Figure 11:
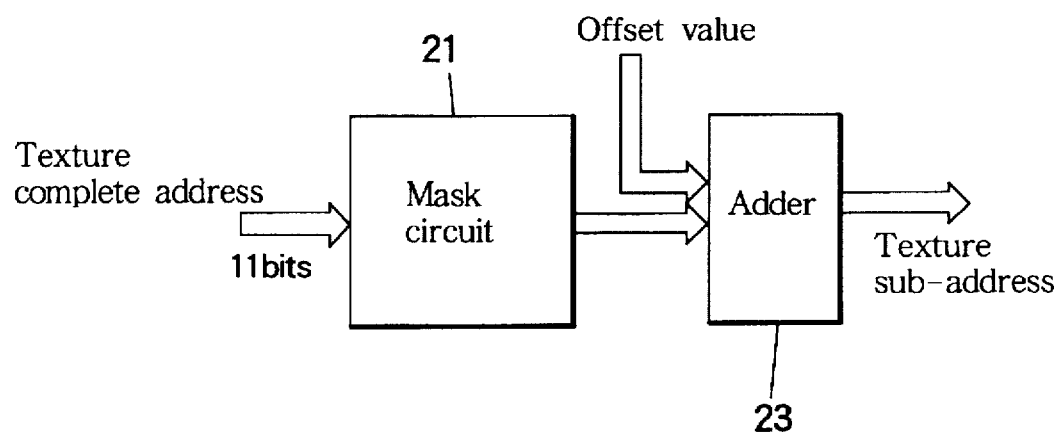
FIG. 11 is another circuit diagram showing the conversion of the texture address.
Figure 12A:
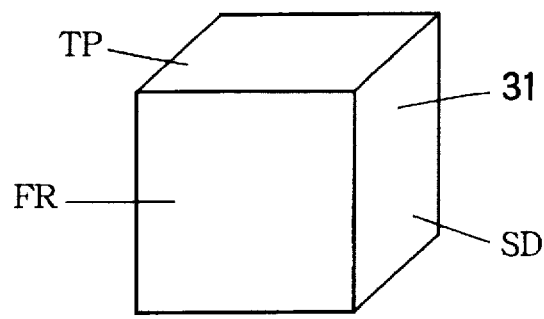
FIGS. 12A, 12B and 12C are schematic diagrams showing a conventional texture mapping method.
Figure 12B:
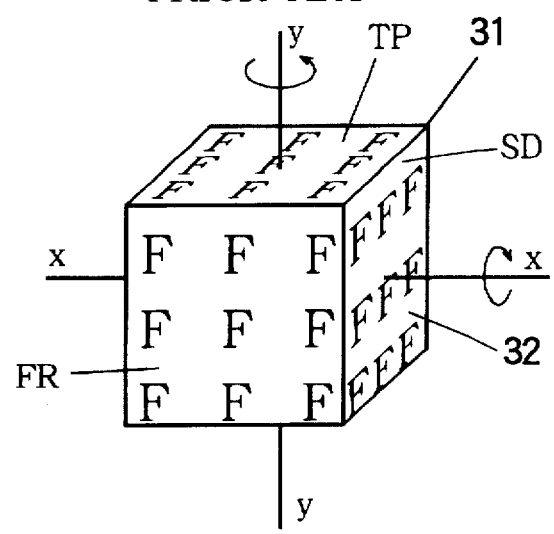
Figure 12C:
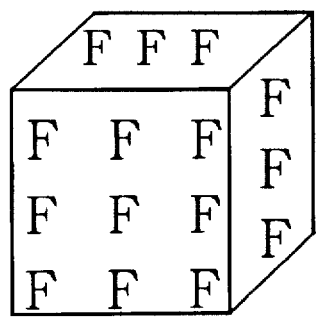

FIG. 11 shows another example of the gate circuit. This embodiment uses an adder 23 in place of the OR gate circuit 22 used in the FIG. 10 embodiment. The adder 23 offsets the texture address by a designated value so as to deal with a plurality of memory regions having different sizes, thereby realizing the desired texture mapping. In such a manner, the texture data representative of a periodic pattern is memorized such that at least a minimum unit of the periodical texture pattern is stored. Then, desired texture coordinates are inputted to carry out the texture mapping, thereby saving memory capacity and simplifying designation of the texture coordinates.

As described above, according to the first aspect of the invention, the texture coordinates are inputted relative to the fill coordinates so as to freely expand, contract, rotate or displace the texture pattern to thereby realize the flexible mapping. Otherwise, the initially inputted fill coordinates are successively updated according to variation of an image area in response to graphic operation of an object, while the initially inputted texture coordinates are fixed regardless of the graphic operation. Accordingly, the texture memory only stores a standard texture pattern to thereby save memory capacity. According to the second aspect of the invention, in the case where the texture data represent the repeat of a basic pattern, the texture memory registers a minimum unit of the basic pattern within a limited memory region. In such a case, higher order bits of the texture address beyond the memory region are masked to convert the same into a sub-address localized to the memory region, thereby realizing the correct mapping without a missing or overflowing of the texture data. Accordingly, the capacity of the texture memory can be significantly reduced. Further, the entire texture memory plane is divided into a plurality of memory regions. Different basic patterns are stored in the respective memory regions. In such a case, an offset value indicating a memory region of the desired pattern is added to higher order bits of the original texture address to convert the same into a sub-address localized to the memory region. In such a manner, many kinds of texture patterns are efficiently reserved in a single memory having a limited capacity. Further, the size of the memory region is freely set to efficiently store the basic pattern.

What is claimed is:

1. A texture mapping apparatus for mapping a desired texture pattern on an image which two-dimensionally represents a three-dimensional object so as to display a surface structure of the object, the apparatus comprising:

frame memory means having storage locations for storing image data representative of the image of the object pixel by pixel, the frame memory means being provided with addresses to indicate the storage locations;

texture memory means having storage locations for storing texture data representative of at least the desired texture pattern, the texture memory means being provided with addresses to indicate the storage locations;

coordinates input means for inputting fill coordinates to designate an area of the image to which the desired texture pattern is allocated, and for separately inputting texture coordinates to designate a corresponding area of the desired texture pattern which is allocated to the area of the image;

address generating means operative based on the inputted fill coordinates for generating fill addresses of the frame memory means which correspond to pixels in the area of the image, the address generating means also being operative based on the inputted texture coordinates for generating texture addresses of the texture memory means which correspond to the fill addresses; and mapping means for reading out the texture data from the storage locations of the texture memory means which are designated by the texture addresses, and for writing the read texture data into the storage locations of the frame memory means which are designated by the corresponding fill addresses, in order to allocate the desired texture pattern to the image of the object, wherein when the address generating means initially generates a texture address that does not fall within the range of storage locations of the texture memory means that stores the desired texture pattern, the initial texture address is converted into a corresponding texture address within the range of storage locations of the texture memory means that stores the desired texture pattern, and the mapping means operates based on the corresponding texture address.

2. The texture mapping apparatus according to claim 1, wherein the coordinates input means comprises:

means for inputting the fill coordinates to designate the area of the image in the form of one polygon having at least three vertexes; and means for inputting the texture coordinates to designate the area of the desired texture pattern in the form of another polygon having the same number of vertexes as said one polygon but having a different shape than said one polygon.

3. The texture mapping apparatus according to claim 1, wherein the coordinates input means comprises:

means for inputting fill coordinates which are successively updated in response to variation of the area of the image according to graphic operation of the object; and means for inputting texture coordinates which are fixed during the graphic operation.

4. The texture mapping apparatus according to claim 3, wherein the address generating means comprises:

means operative based on the fill coordinates representative of the vertexes of said one polygon for interpolatively calculating the fill addresses contained within said one polygon; and means for calculating the corresponding texture addresses according to the texture coordinates representative of vertexes of said another polygon and according to the generated fill addresses.

5. The texture mapping apparatus according to claim 1, wherein the texture memory means has a memory region defined in a part of an entire memory plane of the texture memory means for storing texture data representative of a periodic texture pattern, and has texture complete addresses each composed of a bit train containing higher order bits and lower order bits and being set throughout the entire memory plane while texture sub-addresses each composed of the lower order bits are set within the memory region, the address generating means comprises means for calculating the texture complete addresses according to the texture coordinates and thereafter masking the higher order bits of each texture complete address to convert the same into the texture sub-addresses, and the mapping means comprises means for reading out the texture data from the storage locations within the memory region according to the converted texture sub-addresses.

6. The texture mapping apparatus according to claim 5, wherein the texture memory means has a plurality of memory regions, which are obtained by dividing the entire memory plane, for storing the texture data representative of different texture patterns in respective ones of the memory regions, and the address generating means includes means for feeding the converted texture sub-addresses to the mapping means together with a region number in place of the masked higher order bits so as to specify one of the memory regions from which the desired texture pattern is read out.

7. A texture mapping apparatus for mapping a texture pattern on an image which two-dimensionally represents a three-dimensional object so as to display a surface structure of the object, the apparatus comprising:

frame memory means having storage locations for storing image data representative of the image of the object pixel by pixel, the frame memory means being provided with addresses for indicating the storage locations;

texture memory means having a memory region defined in a part of an entire memory plane of the texture memory means for storing texture data representative of a periodic texture pattern, and having complete addresses each composed of a bit train containing higher order bits and lower order bits while sub-addresses each composed of the lower order bits are assigned to storage locations of the texture data within the memory region;

coordinates input means for inputting fill coordinates to determine an area of the image to which the texture pattern is allocated, and for separately inputting texture coordinates to determine a corresponding area of the periodic texture pattern which is allocated to the area of the image;

address generating means operative based on the fill coordinates for generating fill addresses of the frame memory means which correspond to pixels within the area of the image, the address generating means also being operative based on the texture coordinates for generating texture complete addresses of the texture memory means which correspond to the fill addresses and thereafter masking the higher order bits of each of the texture complete addresses so as to convert the same into texture sub-addresses, so that when the generated texture complete address does not fill within the range of storage locations of the memory region storing the periodic texture pattern, the texture complete address is converted into the corresponding texture sub-address within the range of storage locations of the memory region storing the periodic texture pattern; and mapping means for reading out texture data from the storage locations within the memory region according to the converted texture sub-addresses, and for writing the read texture data into the storage locations of the frame memory means which are designated by the fill addresses, in order to map the periodical texture pattern on the image of the object.

8. The texture mapping apparatus according to claim 7, wherein the texture memory means has a plurality of memory regions, which are defined by dividing the entire memory plane, for storing the texture data representative of different kinds of periodic texture patterns in the respective memory regions, and the address generating means includes means for feeding the converted texture sub-addresses to the mapping means together with a region number in place of the masked higher order bits so as to specify one of the memory regions which stores a desired kind of the periodical texture pattern.

* * * * *